3,723,132
SHELF-STABLE PASTRY PRODUCT

William V. Hodge, Evansville, Ind., and Charleston R. Lee, Bethel, Conn., assignors to General Foods Corporation, White Plains, N.Y.
No Drawing. Filed Apr. 2, 1971, Ser. No. 130,809
Int. Cl. A21d *13/08*
U.S. Cl. 99—92      4 Claims

ABSTRACT OF THE DISCLOSURE

Fat-fried pastry product in which stalage is retarded when stored at room temperatures for periods of up to a year or more are prepared from a dough mix comprising a unique combination of flour, starch and stearyl-2-lactylate. The texture is improved to the point of freshness when the fried products are heated prior to consumption.

---

This invention relates to fat-fried shelf-stable pastry products in which stalage is retarded for periods of a year or more and which contain flour, waxy cornstarch and an emulsifier for the dough.

It is the principal object of this invention to produce a fried pastry product such as a doughnut which can be stored for extended periods of time at room temperature and which, upon heating just prior to consumption, will possess the texture and mouth feel of a freshly made product.

This object is achieved by preparing a dry dough mix comprising in addition to the common dough ingredients, amounts of sodium stearyl-2-lactylate and waxy cornstarch. It has been unexpectedly found that a dough mix which lacks either one of those two ingredients will yield a product of substantially-reduced shelf stability. Conversely, when a dough is prepared with both included and is then cut to size, fat-fried and packaged in a moisture proof container, a pastry product is obtained in which stalage is retarded when stored at room temperature up to a year or more afterwards. The product of this invention is designed to be heated prior to consumption which will increase the freshness of the texture. Heating can be accomplished in an oven or if the product is suitably shaped, in a toaster.

The preferred ranges and types of ingredients employed in the product of this invention are illustrated in the following examples.

EXAMPLE I

A shelf-stable fried doughnut is prepared by forming a dry dough mix from the following ingredients:

| Ingredients: | Percent total weight |
|---|---|
| Wheat flour | 45–65 |
| Granulated sugar | 15–25 |
| Waxy cornstarch | 2–6 |
| Sodium stearyl-2-lactylate | 0.25–2 |
| NFDM solids | 1–4 |
| Shortening | 1–4 |
| Soda | 0.4–1.25 |
| Leavening acid | 0.5–1.3 |

Optionally:

| | |
|---|---|
| Dried egg yolk | 0–3 |
| Lecithinated soya flour | 0–2 |
| Cottonseed flour | 0–0.3 |
| Emulsifiers | 0–1 |
| Salt | 0–1 |
| Potassium sorbate | 0–0.2 |
| Guar gum | 0–0.15 |
| | 100 |

The above dough ingredients are mixed for 1–6 minutes with about 15%–25% water based on dough mix weight, and held at approximately room temperature for 10–30 minutes. The dough is then sheeted to about ⅜" thickness and is cut into smaller pieces of regular doughnut size with the shape desired. If desired an opening is cut in the middle of the dough pieces. The cut pieces are then submerged into 380° F. cooking oil and are fried from about 30–60 seconds. If a maximum thickness is decided upon, such as would be the case if the doughnuts are designed to be heated in a toaster before consumption, the expansion of the dough piece should be restricted during frying by suitable means.

The fried doughnuts are then allowed to cool and are packaged in substantially moisture-proof material. They can be stored at room temperature for periods of up to one year or more without any appreciable stalage occurring. When opened and heated before consumption, the fried doughnuts possess as fresh a texture as though they were just made.

Of the key ingredients listed above the waxy cornstarch and the sodium stearyl-2-lactylate function together to produce a dough product in which stalage is retarded. The NFDM solids act as a barrier against the absorption of fat during the frying process and would not be required if a dough product is desired which is not fried. The flour, sugar, shortening, soda and leavening acid are the normal dough ingredients. An improved product can be obtained with the addition of the optional ingredients within the ranges indicated. If desired, the dough products of this invention may, of course, be coated or filled with the food products normally used for these purposes in the pastry art. Also flavors may be incorporated in the dough itself before frying or cooking takes place.

What we claim is:

1. A dry dough mix for obtaining a fried pastry product in which stalage is retarded when stored at room temperature for approximately one year or more, which comprises, by percentage of the total weight 45%–65% flour, 15%–25% sugar, 2%–6% waxy cornstarch, 0.25%–2% sodium stearyl-2-lactylate, 1%–4% non-fat dry milk solids, 1%–4% shortening, 0.4%–1.25% soda and 0.5%–1.3% of a leavening acid.

2. A fried pastry product packaged in a moisture-proof container whereby stalage is retarded when stored at room temperature for approximately one year or more, which comprises, in addition to the fat absorbed during frying, the dough mix of claim 1 and water.

3. A process for obtaining a fried pastry product in which stalage is retarded when stored at room temperature in a substantially moisture-proof package for approximately one year or more which comprises:

(a) combining the dry dough mix of claim 1 with about 15%–25% water based on the dry dough mix weight, to obtain a wet dough mass;
(b) sheeting the dough mass;
(c) cutting the dough sheet to obtain dough pieces of desired size and shape;
(d) frying the dough pieces in hot cooking oil; and
(e) packaging the fried dough pieces in a substantially moisture-proof package.

4. The process of claim 3 where the dough pieces are fried in oil heated to approximately 380° F. for about 30–60 seconds.

References Cited

UNITED STATES PATENTS

| | | | |
|---|---|---|---|
| 3,535,120 | 10/1970 | Bouchard et al. | 99—91 |
| 3,418,137 | 12/1968 | Getchell et al. | 99—94 |
| 3,656,967 | 4/1972 | Barton | 99—86 |

RAYMOND N. JONES, Primary Examiner

U.S. Cl. X.R.

99—94